US012687853B2

(12) United States Patent
Akatsuka

(10) Patent No.: US 12,687,853 B2
(45) Date of Patent: Jul. 21, 2026

(54) REMOTE SUPPORT APPARATUS

(71) Applicant: TOYOTA JIDOSHA KABUSHIKI KAISHA, Toyota (JP)

(72) Inventor: Kosuke Akatsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 18/647,257

(22) Filed: Apr. 26, 2024

(65) Prior Publication Data

US 2024/0402717 A1     Dec. 5, 2024

(30) Foreign Application Priority Data

Jun. 5, 2023     (JP) ................................. 2023-092550

(51) Int. Cl.
*G05D 1/224*          (2024.01)
*G05D 1/227*          (2024.01)
*G06V 20/56*          (2022.01)

(52) U.S. Cl.
CPC ......... G05D 1/2249 (2024.01); G05D 1/2274 (2024.01); *G06V 20/588* (2022.01)

(58) Field of Classification Search
CPC .............. G05D 1/2249; G05D 1/2274; G05D 2105/20; G05D 2107/13; G05D 2109/10; G05D 1/43; G05D 1/221; G06V 20/588
See application file for complete search history.

(56) References Cited

U.S. PATENT DOCUMENTS

| | | |
|---|---|---|
| 11,215,982 B2 | 1/2022 | Urano et al. |
| 11,325,618 B2 | 5/2022 | Umeda |
| 2019/0137999 A1 | 5/2019 | Taguchi et al. |

| | | | |
|---|---|---|---|
| 2020/0209888 A1 | 7/2020 | Sakai et al. | |
| 2020/0326702 A1 | 10/2020 | Iwamoto et al. | |
| 2020/0341470 A1 | 10/2020 | Maeda et al. | |
| 2021/0041894 A1 | 2/2021 | Urano et al. | |
| 2021/0055741 A1 | 2/2021 | Kawanai et al. | |
| 2021/0058173 A1 | 2/2021 | Otaki et al. | |
| 2021/0072743 A1 | 3/2021 | Otaki et al. | |
| 2021/0080943 A1 | 3/2021 | Iwamoto et al. | |
| 2021/0245747 A1* | 8/2021 | Naithani | B61L 25/025 |
| 2023/0090302 A1* | 3/2023 | Tamagawa | G05D 1/0038 701/2 |
| 2024/0118690 A1* | 4/2024 | Tamagawa | G06T 11/203 |
| 2024/0329633 A1* | 10/2024 | Pedersen | G06V 10/751 |
| 2024/0345588 A1* | 10/2024 | Niiuchi | B60R 1/22 |

FOREIGN PATENT DOCUMENTS

| | | |
|---|---|---|
| JP | 2022-174921 A | 11/2022 |
| WO | 2019/176083 A1 | 9/2019 |

* cited by examiner

*Primary Examiner* — Aniss Chad
*Assistant Examiner* — Nikki Marie M Molina
(74) *Attorney, Agent, or Firm* — Sughrue Mion, PLLC

(57)          ABSTRACT

A remote support apparatus remotely supports a travelling of a vehicle. The remote support apparatus communicates wirelessly with the vehicle. The remote support apparatus wirelessly acquires an image of a view in a travelling direction of the vehicle and displays the acquired image by a displaying device of the remote support apparatus. The image is taken by an imaging device of the vehicle. The remote support apparatus displays a set steering angle line in the image displayed by the displaying device. The set steering angle line is a line along which an outer portion of the vehicle during vehicle turning is predicted to move when the vehicle turns at a set steering angle.

6 Claims, 3 Drawing Sheets

REMOTE SUPPORT APPARATUS

CROSS-REFERENCE TO RELATED APPLICATIONS

This application claims priority to Japanese patent application No. JP 2023-092550 filed on Jun. 5, 2023, the content of which is hereby incorporated by reference in its entirety.

BACKGROUND

Field

The present invention relates to a remote support apparatus.

Description of the Related Art

There is known a remote support apparatus which remotely supports a travelling of a vehicle. As the remote support apparatus, there is also known a remote support apparatus which is configured to provide a remote driver or an operator who remotely drives the vehicle, using the remote support apparatus with information on a travelling route for the vehicle by displaying the travelling route for the vehicle on a display of the remote support apparatus (for example, refer to JP 2022-174921 A).

When the remote driver turns the vehicle at a certain steering angle and can recognize a future travelling of an outer portion of the vehicle during vehicle turning, the remote driver can easily support the travelling of the vehicle.

SUMMARY

An object of the present invention is to provide a remote support apparatus which remotely supports the travelling of the vehicle and helps the remote driver recognize the future travelling of the outer portion of the vehicle during vehicle turning with the certain steering angle.

A remote support apparatus according to the present invention remotely supports a travelling of a vehicle. The remote support apparatus comprises a remote support electronic control unit which communicates wirelessly with the vehicle. The remote support electronic control unit is configured to wirelessly acquire an image of a view in a travelling direction of the vehicle and display the acquired image by a displaying device of the remote support apparatus. The image is taken by an imaging device of the vehicle. The remote support electronic control unit is further configured to display a set steering angle line in the image displayed by the displaying device. The set steering angle line is a line along which an outer portion of the vehicle during vehicle turning is predicted to move when the vehicle turns at a set steering angle.

With the remote support apparatus according to the present invention, the line along which the outer portion of the vehicle during the vehicle turning with the set steering angle moves, is displayed by the displaying device. Thus, a remote driver or an operator who remotely supports the travelling of the vehicle by operating the remote support apparatus, can recognize the future travelling of the outer portion of the vehicle during the vehicle travelling with the set steering angle.

In the remote support apparatus according to an aspect of the present invention, the remote support electronic control unit may be further configured to set the set steering angle such that the set steering angle set when a resolution of the image corresponds to a first resolution, is smaller than the set steering angle set when the resolution of the image corresponds to a second resolution greater than the first resolution.

With the remote support apparatus according to this aspect of the present invention, the set steering angle is set to a small angle when the resolution of the image is relatively low, and thus recognition of an area through which the vehicle travels based on the image is difficult for the remote driver. As a result, the set steering angle line displayed in the image corresponds to a line along which the vehicle moves with the smaller steering angle. Thus, the remote driver can appropriately support the travelling of the vehicle.

In the remote support apparatus according to another aspect of the present invention, the remote support electronic control unit may be further configured to set the set steering angle such that the set steering angle set when an amount of delay of wireless communication with the vehicle corresponds to a first amount of delay, is greater than the set steering angle set when the amount of delay of corresponds to a second amount delay greater than the first amount of delay.

With the remote support apparatus according to this aspect of the present invention, the set steering angle is set to a small angle when the amount of delay of the wireless communication between the vehicle and the remote support apparatus is great, and thus the recognition of the area through which the vehicle travels is difficult for the remote driver. As a result, the set steering angle line displayed in the image corresponds to a line along which the vehicle moves with the smaller steering angle. Thus, the remote driver can appropriately support the travelling of the vehicle.

In the remote support apparatus according to further another aspect of the invention, the vehicle may be configured to automatically stop when wireless communication between the vehicle and the remote support electronic control unit is interrupted. In this aspect, the remote support electronic control unit may be further configured to, when a predicted vehicle stop position is within the image, display the predicted vehicle stop position in the image. The predicted vehicle stop position is a position where the vehicle is predicted to automatically stop when the wireless communication between the vehicle and the remote support electronic control unit is interrupted. The remote support electronic control unit may be further configured to, when the predicted vehicle stop position is not within the image, display the set steering angle line with a visibility higher than the visibility of the set steering angle line displayed when the predicted vehicle stop position is within the image.

When the predicted vehicle stop position is not within the image, the set steering angle line for a remote travelling support for the vehicle should be displayed with a high visibility. With the remote support apparatus according to this aspect of the present invention, when the predicted vehicle stop position is not within the image, the set steering angle line is displayed with a high visibility. Thus, the remote driver can appropriately realize the remote travelling support.

In the remote support apparatus according to further another aspect of the present invention, the remote support electronic control unit may be further configured to display the set steering angle line in the image such that a visibility of the set steering angle line increases as a steering angle of the vehicle increases within a steering angle range equal to or smaller than the set steering angle.

As the steering angle approaches the set steering angle, the steering angle approaches a maximum steering angle. Therefore, the set steering angle line for a remote travelling support for the vehicle should be displayed with a high visibility. With the remote support apparatus according to this aspect of the present invention, as the steering angle approaches the set steering angle, the visibility of the set steering angle line increases. Thus, the remote driver can appropriately support the travelling of the vehicle.

Elements of the invention are not limited to elements of embodiments and modified examples of the invention described with reference to the drawings. The other objects, features and accompanied advantages of the invention can be easily understood from the embodiments and the modified examples of the invention.

DETAILED DESCRIPTION

In an embodiment of the present invention, remote driving, which is a kind of remote support, will be described as an example. The remote driving refers to performing at least a part of DDT (dynamic driving task) by a person at a location remote from a vehicle among remote supports that remotely support the vehicle. Also, the person at a location remote from the vehicle is called a remote driver.

Hereinafter, a remote driving system including a remote support apparatus or a remote driving apparatus according to the embodiment of the present invention will be described with reference to the drawings. Here, in FIG. 1, the remote driving system 10 according to the embodiment is shown. The remote driving system 10 includes a remote driving apparatus 11 and a vehicle 100. The vehicle 100 is equipped with a vehicle control apparatus 12.

The remote driving apparatus 11 is a device installed outside the vehicle 100, and is used to remotely support a traveling of the vehicle 100 as will be described later. In particular, in the present embodiment, the remote driving apparatus 11 is used for remotely driving the vehicle 100.

Figure 1:
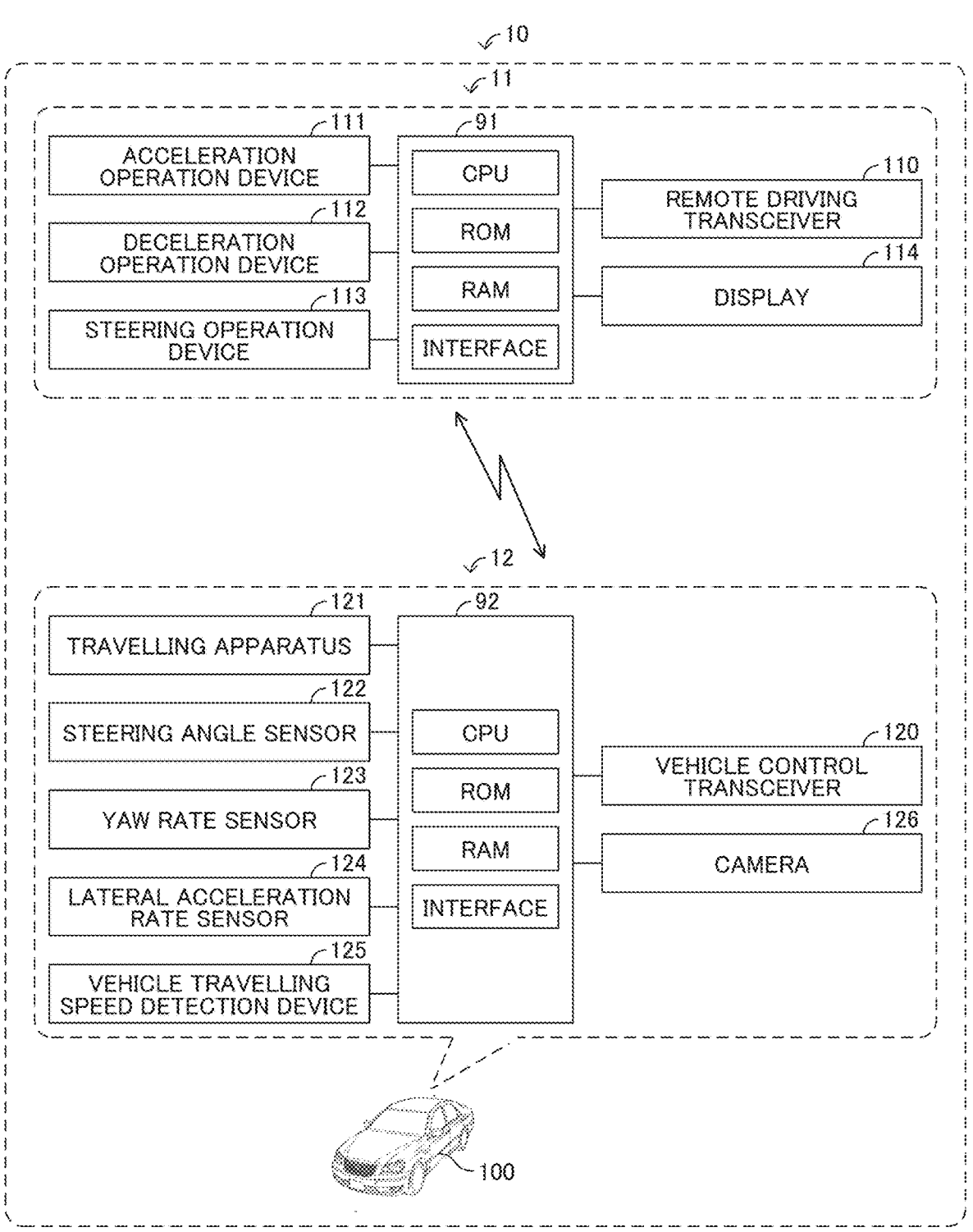
FIG. 1 is a view which shows a remote support system including a remote support apparatus according to an embodiment of the present invention.

As shown in FIG. 1, the remote driving apparatus 11 includes an electronic control unit (or a remote driving ECU 91) as a control device. Similarly, the vehicle control apparatus 12 also includes an electronic control unit (or a vehicle control ECU 92) as a control device.

The remote driving ECU 91 and the vehicle control ECU 92 include a microcomputer as a main part, respectively. The microcomputer includes a storage medium such as a CPU, a ROM, a RAM and a non-volatile memory, an interface, and the like. The CPU is configured or programmed to realize various functions by executing instructions, programs, or routines stored in the storage medium. In particular, in the present embodiment, the remote driving apparatus 11 stores a program for realizing various controls executed by the remote driving apparatus 11 in the storage medium, and the vehicle control apparatus 12 also stores a program for realizing various controls executed by the vehicle control apparatus 12 in the storage medium.

It should be noted that the remote driving apparatus 11 and the vehicle control apparatus 12 may be configured to be able to update the program stored in the storage medium by wireless communication (for example, Internet communication) with external devices, respectively.

The remote driving apparatus 11 is equipped with a transceiver (or a remote driving transceiver 110) as a transmitting-and-receiving device. Further, the vehicle 100 is also equipped with a transceiver (or a vehicle control transceiver 120) as the transmitting-and-receiving device. The remote driving transceiver 110 is electrically connected to the remote driving ECU 91. The vehicle control transceiver 120 is electrically connected to the vehicle control ECU 92. The remote driving apparatus 11 and the vehicle control apparatus 12 can transmit and receive signals (or information) to and from each other via the remote driving transceiver 110 and the vehicle control transceiver 120. That is, the remote driving apparatus 11 can wirelessly communicate with the vehicle 100.

In particular, the remote driving apparatus 11 and the vehicle control apparatus 12 perform remote operation (remote support) of the vehicle 100. The vehicle control apparatus 12 transmits, to the remote driving apparatus 11 as information used by the remote driving apparatus 11 to perform the remote operation of the vehicle 100, identification information (so-called ID) of the vehicle 100, time of transmitting the information from the vehicle 100, a position of the vehicle 100, a traveling speed of the vehicle 100, an acceleration rate of the vehicle 100, a traveling direction of the vehicle 100, a direction indicator signal of the vehicle 100, horn information of the vehicle 100, an amount of fuel of the vehicle 100 and/or an amount of battery charge of the vehicle 100, abnormality information of the vehicle 100, and various information such as tire friction and/or road friction of the vehicle 100.

Further, the vehicle 100 is equipped with a traveling apparatus 121. The traveling apparatus 121 is an apparatus for traveling the vehicle 100, and includes a driving apparatus, a braking apparatus, and a steering apparatus in the present embodiment. The driving apparatus is an apparatus which applies a driving force to the vehicle 100. The braking apparatus is an apparatus which applies a braking force to the vehicle 100. The steering apparatus is an apparatus which applies a steering force to the vehicle 100.

Further, the vehicle 100 is equipped with a steering angle sensor 122, a yaw rate sensor 123, a lateral acceleration rate sensor 124, a vehicle travelling speed detection device 125, and a camera 126 as an imaging device.

The steering angle sensor 122, the yaw rate sensor 123, the lateral acceleration rate sensor 124, the vehicle travelling speed detection device 125, and the camera 126 are electrically connected to the vehicle control ECU 92, respectively. The vehicle control apparatus 12 acquires a steering angle of the vehicle 100 as a steering angle δ by the steering angle sensor 122, acquires a yaw rate of the vehicle 100 as a yaw rate YR by the yaw rate sensor 123, acquires a lateral acceleration rate of the vehicle 100 as a lateral acceleration rate Gy by the lateral acceleration rate sensor 124, acquires a traveling speed of the vehicle 100 as a vehicle travelling speed V by the vehicle travelling speed detection device 125, and acquires images of a view around the vehicle 100 as a camera image by the camera 126.

The vehicle control apparatus 12 transmits the information on the acquired steering angle δ, the acquired yaw rate YR, the acquired lateral acceleration rate Gy, the acquired vehicle travelling speed V, and the acquired camera image to the outside of the vehicle 100 via the vehicle control transceiver 120. The information transmitted from the vehicle control apparatus 12 is acquired by the remote driving ECU 91 via the remote driving transceiver 110.

Further, the remote driving apparatus 11 is equipped with an acceleration operation device 111, a deceleration operation device 112, a steering operation device 113, and a display 114 as a displaying device.

The acceleration operation device 111, the deceleration operation device 112, the steering operation device 113, and the display 114 are electrically connected to the remote driving ECU 91, respectively.

The acceleration operation device 111 is a device operated by the remote driver to apply the driving force to the vehicle 100. When the acceleration operation device 111 is operated, the remote driving apparatus 11 transmits acceleration operation information or information related to an operation applied to the acceleration operation device 111 to the outside of the remote driving apparatus 11 via the remote driving transceiver 110. The vehicle control apparatus 12 acquires the acceleration operation information transmitted by the remote driving apparatus 11 via the vehicle control transceiver 120, and controls an operation of the traveling apparatus 121 based on the acquired acceleration operation information to apply the driving force to the vehicle 100.

It should be noted that the remote driver is a person who remotely supports the traveling of the vehicle 100 by using the remote driving apparatus 11, and in the present embodiment, is a person who remotely drives the vehicle 100 by using the remote driving apparatus 11.

The deceleration operation device 112 is a device operated by the remote driver to apply the braking force to the vehicle 100. When the deceleration operation device 112 is operated, the remote driving apparatus 11 transmits deceleration operation information or information related to an operation applied to the deceleration operation device 112 to the outside of the remote driving apparatus 11 via the remote driving transceiver 110. The vehicle control apparatus 12 acquires the deceleration operation information transmitted by the remote driving apparatus 11 via the vehicle control transceiver 120, and controls the operation of the traveling apparatus 121 based on the acquired deceleration operation information to apply the braking force to the vehicle 100.

The steering operation device 113 is a device operated by the remote driver to apply the steering force to the vehicle 100. When the steering operation device 113 is operated, the remote driving apparatus 11 transmits steering operation information or information related to an operation applied to the steering operation device 113 to the outside of the remote driving apparatus 11 via the remote driving transceiver 110. The vehicle control apparatus 12 acquires the steering operation information transmitted from the remote driving apparatus 11 via the vehicle control transceiver 120, and controls the operation of the traveling apparatus 121 based on the acquired steering operation information to apply the steering force to the vehicle 100.

The display 114 is a device which displays an image. The remote driving apparatus 11 can display various images on the display 114. In particular, the remote driving apparatus 11 displays on the display 114, the camera image in the traveling direction of the vehicle 100 acquired from the vehicle control apparatus 12 by wireless communication.

It should be noted that the display 114 may include only a display which displays the camera image in the traveling direction of the vehicle 100, or may include a left side monitor which displays the camera image of a view at the left side of the vehicle 100 and an image of a view reflected in a left side mirror of the vehicle 100, and a right side monitor which displays the camera image of a view at the right side of the vehicle and an image of a view reflected in a right side mirror of the vehicle 100 in addition to the display which displays the camera image in the traveling direction of the vehicle 100.

<Operations of Remote Driving System>

Next, operations of the remote driving system 10 will be described. The remote driving system 10 is a system of remotely driving the vehicle by the remote driver operating the acceleration operation device 111, the deceleration operation device 112, and the steering operation device 113 of the remote driving apparatus 11.

Therefore, as described above, when the remote driver operates the acceleration operation device 111, the deceleration operation device 112, and the steering operation device 113, the remote driving apparatus 11 transmits the acceleration operation information, the deceleration operation information, and the steering operation information to the vehicle 100, and the vehicle control apparatus 12 controls the operation of the traveling apparatus 121 based on the acquired acceleration operation information, the acquired deceleration operation information, and the acquired steering operation information to travel the vehicle 100.

Figure 2:
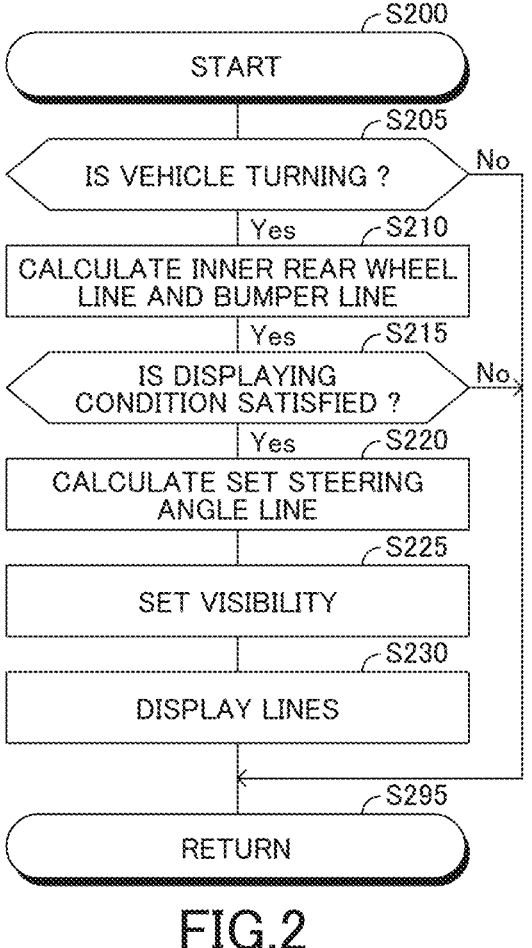
FIG. 2 is a view which shows a flowchart of a routine executed by the remote support apparatus according to the embodiment of the present invention.

Further, the remote driving apparatus 11 is configured to execute a routine shown in FIG. 2 at a predetermined calculation cycle, and when a predetermined condition is satisfied, displays an inner rear wheel line Lin, a bumper line Lbp, and a set steering angle line Lset as supplementary lines (or auxiliary lines) on the display 114.

That is, at a predetermined timing, the remote driving apparatus 11 starts a process from a step S200 of the routine shown in FIG. 2 and proceeds with the process to a step S205 to determine whether or not the vehicle 100 is turning. The remote driving apparatus 11 determines whether or not the vehicle 100 is turning based on the steering angle δ, the yaw rate YR, the lateral acceleration rate Gy, and the like.

When the remote driving apparatus 11 determines "Yes" at the step S205, the remote driving apparatus 11 proceeds with the process to a step S210 to calculate and acquire the inner rear wheel line Lin and the bumper line Lbp.

The inner rear wheel line Lin is a line along which an inner rear wheel of the vehicle 100 during vehicle turning, i.e., one of left and right rear wheels of the vehicle 100 moving through the inside of the vehicle turning is predicted to move in the future. It should be noted that the remote driving apparatus 11 may be configured to calculate and acquire, instead of the inner rear wheel line Lin, a line along which an innermost part of the vehicle 100 during the vehicle turning, i.e., an innermost part of a left side portion or a right side portion of the vehicle 100 moving through the innermost of the vehicle turning is predicted to move in the future.

Further, the bumper line Lbp includes a bumper left end line Lbp_L or a line along which a left end of a front bumper of the vehicle 100 is predicted to move in the future, and a bumper right end line Lbp_R or a line along which a right end of the front bumper of the vehicle 100 is predicted to move in the future.

It should be noted that the remote driving apparatus 11 calculates the inner rear wheel line Lin and the bumper line Lbp based on the steering angle δ, the yaw rate YR, the lateral acceleration rate Gy, and the like.

Further, the inner rear wheel line Lin calculated by the remote driving apparatus 11 may have a constant length independently of the steering angle δ, but in the present embodiment, the inner rear wheel line Lin calculated by the remote driving apparatus 11 has a length varying depending on the steering angle δ. In particular, the remote driving apparatus 11 is configured to calculate the inner rear wheel line Lin having a length such that the length increases as the steering angle δ increases. That is, the remote driving apparatus 11 is configured to predict the inner rear wheel line Lin having a length such that the length when the steering angle δ of the vehicle 100 corresponds to a first steering angle, is shorter than the length when the steering angle δ of the vehicle 100 corresponds to a second steering angle greater than the first steering angle.

Further, when the vehicle 100 is turning to the left, a line along which the left rear wheel is predicted to move in the future is calculated as the inner rear wheel line Lin, and when the vehicle 100 is turning to the right, a line along with the right rear wheel is predicted to move in the future is calculated as the inner rear wheel line Lin.

Next, the remote driving apparatus 11 proceeds with the process to a step S215 to determine whether or not a displaying condition is satisfied.

The display condition is a condition for displaying the inner rear wheel line Lin, the bumper line Lbp, and the set steering angle line Lset on the display 114, and in the present embodiment, at least one of a vehicle travelling speed condition that the vehicle travelling speed V is smaller than or equal to a relatively small predetermined vehicle travelling speed (or a predetermined displaying speed Vdp), a steering angle condition that the steering angle δ is greater than or equal to a relatively great predetermined steering angle (or a predetermined displaying steering angle δdp), and a crossing condition that the inner rear wheel line Lin or the bumper line Lbp crosses an object in the camera image when the inner rear wheel line Lin and the bumper line Lbp are displayed in the camera image.

It should be noted that the camera image displayed on the display 114 is the camera image of the view in the traveling direction of the vehicle 100, and the remote driving apparatus 11 determines whether or not the inner rear wheel line Lin or the bumper line Lbp crosses the object in the camera image displayed on the display 114 by an image processing based on information on the camera image, information on the inner rear wheel line Lin, and information on the bumper line Lbp.

When the remote driving apparatus 11 determines "Yes" at the step S215, the remote driving apparatus 11 proceeds with the process to a step S220 to calculate and acquire the set steering angle Lset.

The set steering angle line Lset is a line along which an outer portion of the vehicle 100 during the vehicle turning, i.e., a portion of the vehicle 100 moving through the outside of the vehicle turning is predicted to move when the vehicle 100 turns with a relatively great predetermined steering angle (or a set steering angle δset), and in the present embodiment, in particular, is a line along which an outermost portion of the vehicle 100 moving through the outermost of the vehicle turning is predicted to move in the future when the vehicle 100 turns with the set steering angle δset.

The set steering angle δset may be a maximum steering angle of the vehicle 100, but in the present embodiment, the set steering angle δset is set to an angle within a predetermined angle range smaller than the maximum steering angle of the vehicle 100 based on at least one of an operation proficiency of the remote driver, a camera image resolution, and a communication delay degree.

In particular, the set steering angle δset decreases as the operation proficiency of the remote driver decreases, that is, experience that the remote driver has travelled the vehicle 100 remotely by the remote driving apparatus 11 decreases.

Further, the set steering angle δset decreases as the camera image resolution decreases, that is, as resolution of the camera image displayed on the display 114 decreases. In other words, the set steering angle δset set when the resolution of the camera image displayed on the display 114 corresponds to a first resolution, is smaller than the set steering angle δset set when the resolution of the camera image displayed on the display 114 corresponds to a second resolution greater than the first resolution.

Further, the set steering angle δset decreases as the communication delay degree increases, that is, as a degree of delay of wireless communication performed between the remote driving ECU 91 and the vehicle control ECU 92 increases. In other words, the set steering angle set when an amount of delay of the wireless communication between the remote driving apparatus 11 and the vehicle 100 corresponds to a first amount of delay, is greater than the set steering angle set when the amount of delay of the wireless communication between the remote driving apparatus 11 and the vehicle 100 corresponds to a second amount of delay greater than the first amount of delay.

It should be noted that an upper limit value of the set steering angle δset may be set as appropriate, and may be set to an angle (for example, an angle of 90% of the maximum steering angle of the vehicle 100) in consideration of, for example, design variation and manufacturing variation of the vehicle 100.

Further, the remote driving apparatus 11 calculates the set steering angle Lset based on a turning radius ρ of the vehicle 100 when the vehicle 100 turns with the set steering angle δset.

For example, the turning radius ρ of the vehicle 100 when the vehicle 100 turns with the set steering angle δset can be acquired by calculation according to an equation 1 below. In the equation 1, "Kh" is a stability factor, "V" is the vehicle travelling speed V, "L" is a wheel base of the vehicle 100, and "δset" is the set steering angle δset.

$$\rho = (1 + Kh \times V^2) \times L/\delta set \qquad (1)$$

When the set steering angle Lset is calculated, the vehicle travelling speed V is at a low speed close to zero, and thus the equation 1 can be approximated as in an equation 2 below.

$$\rho = L/\delta set \qquad (2)$$

Therefore, the remote driving apparatus 11 acquires the turning radius ρ of the vehicle 100 when the vehicle 100 turns with the set steering angle δset by the calculation according to the equation 2, and calculates the set steering angle line Lset based on the acquired turning radius ρ.

It should be noted that, as the set steering angle line Lset, a line along which a right portion of the vehicle 100 moves in the future when the vehicle 100 turns to the left with the set steering angle δset and a line along which a left portion of the vehicle 100 moves in the future when the vehicle 100 turns to the right with the set steering angle δset may be acquired by calculation. Alternatively, the remote driving apparatus 11 may be configured to calculate and acquire only the line along which the right portion of the vehicle 100 moves in the future when the vehicle 100 turns to the left, and calculate and acquire only the line along which the left portion of the vehicle 100 moves in the future when the vehicle 100 turns to the right.

Next, the remote driving apparatus 11 proceeds with the process to a step S225 to set visibility (or attractiveness) of the set steering angle line Lset.

In the present embodiment, the visibility of the set steering angle line Lset is determined, depending on at least one of the vehicle travelling speed V, the steering angle δ, the operation proficiency of the remote driver, and whether a stop area line Lsp is displayed on the display 114. In particular, the visibility of the set steering angle line Lset increases as the vehicle travelling speed V decreases. Further, the visibility of the set steering angle line Lset increases as the steering angle δ increases within an angle range equal to or smaller than the set steering angle δset. Further, the visibility of the set steering angle line Lset increases as the operation proficiency of the remote driver decreases. Further, the visibility of the set steering angle line Lset set when the stop area line Lsp is not displayed on the display 114, is greater than the visibility of the set steering angle line Lset set when the stop area line Lsp is displayed on the display 114.

In the present embodiment, the vehicle control apparatus 12 is configured to automatically stop the vehicle 100 when the wireless communication between the vehicle control apparatus 12 and the remote driving apparatus 11 is interrupted, and the stop area line Lsp is a line showing a predicted vehicle stop position or a position where the vehicle 100 is automatically stopped. The remote driving apparatus 11 is configured to display the stop area line Lsp on the display 114. In this regard, when the vehicle travelling speed V is relatively great, the stop area line Lsp is located relatively far from the vehicle 100. Thus, the remote driving apparatus 11 can display the stop area line Lsp on the display 114. On the other hand, when the vehicle travelling speed V is relatively low, the stop area line Lsp is located relatively close to the vehicle 100. Thus, the remote driving apparatus 11 cannot display the stop area line Lsp on the display 114. Therefore, in the present embodiment, the stop area line Lsp may or may not be displayed on the display 114. Therefore, the remote driving apparatus 11 is configured to display the set steering angle line Lset in the camera image displayed on the display 114 such that the visibility of the set steering angle line Lset set when the predicted stop position (or the stop area line Lsp) is not displayed in the camera image displayed on the display 114, is greater than the visibility of the set steering angle line Lset set when the predicted stop position (or the stop area line Lsp) is displayed in the camera image displayed on the display 114.

Figure 3:
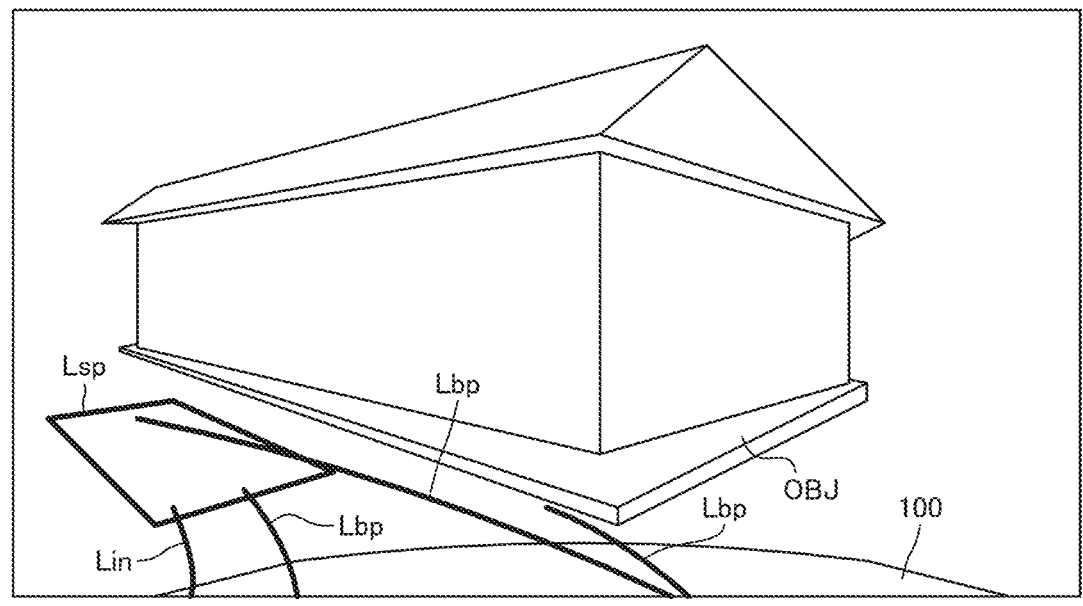
FIG. 3 is a view which shows a display of the remote support apparatus according to the embodiment of the present invention.

Next, the remote driving apparatus 11 proceeds with the process to a step S230 to display the inner rear wheel line Lin and the bumper line Lbp in the camera image displayed on the display 114, and display the set steering angle line Lset in the camera image displayed on the display 114 with the visibility set at the step S225 as shown in FIG. 3.

When the inner rear wheel line Lin, the bumper line Lbp, and the set steering angle line Lset are displayed in the camera image displayed on the display 114, images of the inner rear wheel line Lin, the bumper line Lbp, and the set steering angle line Lset may be displayed so as to be superimposed on the camera image, or may be displayed after combining data of the images of the inner rear wheel line Lin, the bumper line Lbp, and the set steering angle line Lset with data of the camera image.

In this case, in the camera image displayed on the display 114, the remote driving apparatus 11 displays the inner rear wheel line Lin at a position predicted to be a position along which the rear inner wheel of the vehicle 100 moves during the vehicle turning, displays the bumper left end line Lbp_L at a position predicted to be a position along which the left end of the front bumper of the vehicle 100 moves during the vehicle turning, displays the bumper right end line Lbp_R at a position predicted to be a position along which the right end of the front bumper of the vehicle 100 moves during the vehicle turning, and displays the set steering angle line Lset at a position predicted to be a position along which the outermost portion of the vehicle 100 during the vehicle turning moves when the steering angle δ corresponds to the set steering angle δset.

In this case, when the display 114 includes the left side monitor and the right side monitor, the inner rear wheel line Lin, the bumper line Lbp, or the set steering angle line Lset may be displayed on the left side monitor or the right side monitor.

Also, the remote driving apparatus 11 may be configured to set the visibility of the inner rear wheel line Lin and/or the bumper line Lbp similar to the visibility of the set steering angle line Lset and display the inner rear wheel line Lin and/or the bumper line Lbp on the display 114 with the visibility thus set.

Further, the remote driving apparatus 11 may be configured to display the inner rear wheel line Lin on the display 114 with high visibility when the inner rear wheel line Lin crosses an object in the camera image when the inner rear wheel line Lin is displayed in the camera image on the display 114. Further, in this case, the remote driving apparatus 11 may be configured to highlight a portion of the image on the display 114 where the inner rear wheel line Lin crosses the object in the camera image and a surrounding thereof by coloring the portion and the surrounding thereof or blinking the portion.

In the present embodiment, the visibility of the set steering angle line Lset is changed by, for example, changing a density of the set steering angle line Lset, changing a color of the set steering angle line Lset, switching a line type of the set steering angle line Lset between a solid line and a chain line, or continuously lighting and blinking the set steering angle line Lset.

In FIG. 3, a reference numeral OBJ is an object in the camera image.

Then, the remote driving apparatus 11 proceeds with the process to a step S295 to terminate executing this routine once.

When the remote driving apparatus 11 determines "No" at the step S205 or the step S215, the remote driving apparatus 11 proceeds with the process directly to the step S295 to terminate executing this routine once.

The operations of the remote driving system 10 have been described. As described above, the remote driving apparatus 11 includes a remote driving control apparatus (i.e. the remote driving ECU 91) which wirelessly communicates with the vehicle 100, and remotely supports the traveling of the vehicle 100. Then, the remote driving control device (i.e., the remote driving ECU 91) wirelessly acquires an image (i.e., the camera image) in the traveling direction of the vehicle 100 acquired by an imaging device (i.e., the camera 126) of the vehicle 100, displays the acquired image (i.e., the acquired camera image) by a display device (i.e., the display 114) of the remote driving apparatus 11, and displays the inner rear wheel line Lin, which is a line along which the inner rear wheel of the vehicle 100 during the vehicle turning is predicted to move, in the camera image displayed by the display device (i.e., the display 114) while the vehicle 100 is turning.

Thereby, while the vehicle 100 is turning, the inner rear wheel line Lin is displayed in the image (i.e., camera image)

in the traveling direction of the vehicle 100. Therefore, an operator (i.e., the remote driver) who operates the remote driving apparatus 11 to remotely support the traveling of the vehicle 100 can recognize the future travelling of the vehicle 100.

Further, the remote driving apparatus 11 displays the set steering angle Lset in the image (i.e., the camera image) displayed by the display device (i.e., the display 114).

Thereby, the remote driver can recognize a line along which an outer portion of the vehicle 100 during the vehicle turning moves (i.e., the set steering angle line Lset) when the remote driver turns the vehicle 100 with the set steering angle δset.

It should be noted that the present invention is not limited to the above-described embodiments, and various modifications can be adopted within the scope of the present invention.

The present invention can be applied not only to the remote driving but also to the remote support in general including the remote support and a remote monitoring. It should be noted that the remote support is to provide information for continuing an automatic driving by a remote support person located remotely from an automatic driving vehicle when a situation in which the automatic driving vehicle cannot respond is encountered. Further, the remote monitoring is to monitor at least one of a communication state, a traveling environment, a vehicle state, an automatic driving system state, and a passenger state of the automatic driving vehicle by a person located remotely from the automatic driving vehicle.

What is claimed is:

1. A remote support apparatus of remotely supporting a travelling of a vehicle, the remote support apparatus comprising a remote support electronic control unit which communicates wirelessly with the vehicle, wherein the remote support electronic control unit is configured to:

wirelessly acquire an image of a view in a travelling direction of the vehicle and display the acquired image by a displaying device of the remote support apparatus, the image being taken by an imaging device of the vehicle; and display a set steering angle line in the image displayed by the displaying device, the set steering angle line being a line along which an outer portion of the vehicle during vehicle turning is predicted to move when the vehicle turns at a set steering angle, the set steering angle not being an actual steering angle set by a remote operator who drives the vehicle remotely, and the set steering angle being set based on at least one of a resolution of the image and an amount of delay of wireless communication with the vehicle.

2. The remote support apparatus according to claim 1, wherein the remote support electronic control unit is configured to set the set steering angle such that the set steering angle set when the resolution of the image corresponds to a first resolution, is smaller than the set steering angle set when the resolution of the image corresponds to a second resolution greater than the first resolution.

3. The remote support apparatus according to claim 1, wherein the remote support electronic control unit is configured to set the set steering angle such that the set steering angle set when the amount of delay of wireless communication with the vehicle corresponds to a first amount of delay, is greater than the set steering angle set when the amount of delay of corresponds to a second amount delay greater than the first amount of delay.

4. The remote support apparatus according to claim 1, wherein the vehicle is configured to automatically stop when wireless communication between the vehicle and the remote support electronic control unit is interrupted, and wherein the remote support electronic control unit is configured to:

when a predicted vehicle stop position is within the image, display the predicted vehicle stop position in the image, the predicted vehicle stop position being a position where the vehicle is predicted to automatically stop when the wireless communication between the vehicle and the remote support electronic control unit is interrupted; and when the predicted vehicle stop position is not within the image, display the set steering angle line with a visibility higher than the visibility of the set steering angle line displayed when the predicted vehicle stop position is within the image.

5. The remote support apparatus according to claim 1, wherein the remote support electronic control unit is configured to display the set steering angle line in the image such that a visibility of the set steering angle line increases as a steering angle of the vehicle increases within a steering angle range equal to or smaller than the set steering angle.

6. The remote support apparatus according to claim 1, wherein the remote support electronic control unit is configured to display an inner rear wheel line in the image displayed by the displaying device, the inner rear wheel line being a line along which an inner rear wheel of the vehicle during vehicle turning is predicted to move.

\* \* \* \* \*